United States Patent
Neeleman (10) Patent No.: US 9,817,560 B2
(45) Date of Patent: Nov. 14, 2017

(54) METHOD FOR MANAGING DOCUMENTS ON A MOBILE DEVICE

(71) Applicant: OCE-TECHNOLOGIES B.V., Venlo (NL)

(72) Inventor: Marinus P. Neeleman, Nijmegen (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 360 days.

(21) Appl. No.: 14/617,662

(22) Filed: Feb. 9, 2015

(65) Prior Publication Data

US 2015/0153939 A1 Jun. 4, 2015

Related U.S. Application Data

(63) Continuation of application No. PCT/EP2013/066520, filed on Aug. 7, 2013.

(30) Foreign Application Priority Data

Aug. 22, 2012 (EP) ..................... 12181335

(51) Int. Cl.
*G06F 17/00* (2006.01)
*G06F 3/0484* (2013.01)
(Continued)

(52) U.S. Cl.
CPC ........ *G06F 3/04842* (2013.01); *G06F 3/1204* (2013.01); *G06F 3/1267* (2013.01);
(Continued)

(58) Field of Classification Search
CPC ................................. G06F 3/04842
See application file for complete search history.

(56) References Cited

U.S. PATENT DOCUMENTS 6,393,429 B1 * 5/2002 Yagi ..................... G06F 3/0481
707/795
7,149,729 B2 * 12/2006 Kaasten ............ G06F 17/30115
707/754
(Continued)

FOREIGN PATENT DOCUMENTS

EP 2 426 595 A2 3/2012
WO WO 2007/026938 A1 3/2007

OTHER PUBLICATIONS

Oracle Fusion Middleware User's Guide for Oracle Business Intelligence Mobile, "Chapter 3: Using Oracle Business Intelligence Mobile," retrieved from https://docs.oracle.com/cd/E23943_01/bi.1111/e25318/using.htm, May 2012, 20 pages.*
RecentFilesView v1.33—View the list of recently opened files, Copyright (c) 2007-2017 Nir Sofer, retrieved from http://www.nirsoft.net/utils/recent_files_view.html, p. 1-4.*

*Primary Examiner* — Amelia Tapp
(74) *Attorney, Agent, or Firm* — Birch, Stewart, Kolasch & Birch, LLP (57) ABSTRACT

A method for managing a document at a mobile device having a user interface screen, the mobile device being arranged for a wireless connection to a reproduction unit and loaded with a mobile application for sending documents to the reproduction unit, includes opening the document by the mobile application at most a complete desktop area on the user interface screen, storing the document in memory of the mobile device, closing the document by the mobile application at the user interface screen, and automatically showing the document stored by the mobile application at the desktop area by means of a representation after the document is closed. A mobile device is provided for performing the method.

9 Claims, 8 Drawing Sheets

(51) Int. Cl.
 *G06F 3/12* (2006.01)
 *H04M 1/725* (2006.01)
 *G06F 17/21* (2006.01)
 *G06F 17/22* (2006.01)

(52) U.S. Cl.
 CPC .......... *G06F 3/1292* (2013.01); *G06F 17/212* (2013.01); *G06F 17/2235* (2013.01); *H04M 1/7253* (2013.01)

(56) References Cited

U.S. PATENT DOCUMENTS

| | | | | |
|---|---|---|---|---|
| 7,328,245 | B1* | 2/2008 | Hull | G06Q 10/107 709/206 |
| 7,739,622 | B2* | 6/2010 | DeLine | G06F 3/0483 345/660 |
| 8,301,723 | B2* | 10/2012 | King | G06F 3/0481 709/205 |
| 8,402,382 | B2* | 3/2013 | Agarawala | G06F 3/0483 345/173 |
| 8,555,185 | B2* | 10/2013 | Louch | G06F 3/0481 715/769 |
| 9,053,412 | B2* | 6/2015 | Chakirov | G06K 15/40 |
| 2008/0307362 | A1* | 12/2008 | Chaudhri | G06F 3/0481 715/835 |
| 2011/0157623 | A1* | 6/2011 | Nakayama | G06F 3/04817 358/1.15 |

* cited by examiner

METHOD FOR MANAGING DOCUMENTS ON A MOBILE DEVICE

CROSS-REFERENCE TO RELATED APPLICATIONS

This application is a Continuation of International Application No. PCT/EP2013/066520, filed on Aug. 7, 2013, and for which priority is claimed under 35 U.S.C. §120. PCT/EP2013/066520 claims priority under 35 U.S.C. §119(a) to Application No. 12181335.6, filed in Europe on Aug. 22, 2012. The entire contents of each of the above-identified applications are hereby incorporated by reference into the present application.

BACKGROUND OF THE INVENTION

1. Field of the Invention

The present invention relates to a method of managing a document on a mobile device implemented as a mobile application, the mobile device having a user interface screen and being arranged for a wireless connection to a reproduction unit, the method comprising the step of opening the mobile application on the user interface screen.

2. Description of Background Art

Nowadays, mobile devices are usually provided with a user interface screen, which is a touch screen that is sensitive for a single touch or multi-touch gestures. Touching the screen may be done with a touching device like a finger of a human being, a pen or stylus. Further on, the term clicking comprises also touching the screen. Clicking may also be realized by a pen or a mouse click. In the latter case, a mouse device is connectable to the mobile device. The mobile device may a mobile phone, a tablet personal computer, a notebook computer, a laptop computer or the like.

Mobile devices are known, which have loaded a mobile application for opening a digital document like a photo, a digital image, a webpage, an electronic document, etc. Such a mobile application is also known as an "app." An app can be uploaded to a dedicated storage for apps, also named an app store. A user of a mobile device may download an app from the app store for use on the mobile device. Examples of such a mobile application are a mobile application that provides access to an electronic cloud service (online storage of files, such as Dropbox™ or box.net), a document format viewer mobile application, a display mobile application like a photo gallery mobile application, etc. The mobile applications are usually gathered on a desktop of the mobile device. The desktop of the mobile device is a window, which is opened when starting up the mobile device. The desktop of the mobile device is perceived by the user as a background. The desktop comprises, for example, icons for each mobile application installed. In some mobile applications, a digital document may be requested by the user and the user can open the file in another mobile application (for example, via an Open In feature in an appropriate menu). The other mobile application according to the present invention is meant for viewing or printing, and opens the digital document subsequently. Such other mobile application may be aimed at showing the digital document in more detail to the user or for browsing through pages of the digital document. Such other mobile application may also be aimed at reproduction of the digital document by a reproduction unit like a printer. When opening a document in such other mobile application, the document is also stored in the memory of the mobile device or on a memory location in a web cloud. The mobile device is wirelessly connected to the reproduction unit and can send print jobs to the reproduction unit by means of such other mobile application. In the case of a mobile application for printing, such other mobile application usually has a reproduction activating button for sending the digital document to the reproduction unit. When such other mobile application has sent the digital document to the reproduction unit, the digital document disappears from the mobile application, the mobile application is closed and the digital document is removed from the RAM of the mobile device.

When the same document has to be reprinted, the whole procedure has to be repeated. This is in particular cumbersome for the user who wants to print a lot of digital files at different moments in time.

SUMMARY OF THE INVENTION

It is an object of the present invention to overcome this disadvantage when using a mobile device, which has loaded such a mobile application for printing a digital document.

This object is achieved by a method according to the preamble, the method further comprising the steps of showing a desktop area on the user interface screen, and loading links to documents from a storage, the links to documents having been opened in previous sessions of the mobile application, and showing representations on the desktop area, the representations being associated to the loaded links to the documents.

Previously opened documents have been opened by the mobile application at a moment in time before the moment in time of opening the current document. By showing representations on the desktop area associated to the loaded links to the previously opened documents, a history of previously opened documents is available at the desktop area of the mobile application. Moreover, a previously opened document is easily opened again, for example by clicking on the representation on the desktop area corresponding to the document. If several documents have been opened and closed again, the desktop area comprises a plurality of representations. Each of these representations represents a digital document, which has been previously opened by the mobile application. A plurality of links linking to digital documents represented on the desktop area may also be stored in a memory of the mobile device or a memory in a web cloud. The corresponding documents may also be stored it such memories. This is advantageous, since such memories may be arranged to be insusceptible to a switch off of the mobile device. When the mobile device is switched off and on again, a digital document may be opened again by means of the mobile application, the links comprised in this memory are fetched and the desktop area is shown, which comprises representations that were present at the desktop area before switching off the mobile device. A representation of the document may be a thumbnail image, an icon or a filename. The thumbnail image may contain the first page or first image of the document.

According to an embodiment of the present invention, the representation is movable to any place of the desktop area. In particular, when a new representation is stored at the desktop area at a location that is determined by the mobile application, the user may want to order the representations according to his wishes. The new location may also be stored in a memory of the mobile device. The representation may be displayed at a randomly determined location on the desktop area. This is advantageous when no specific order in opening the documents is predetermined and the desktop area may be configured to serve any need of ordering.

According to an embodiment of the present invention, the method further comprises the steps of opening a document in the mobile application on the desktop area according to a size that equals at most the size of the desktop area, permanently storing a link to the opened document, closing the document by the mobile application, and automatically showing the desktop area comprising the representation of the linked document in addition to representations of files for which links were already stored in previous sessions of the mobile application. In a further embodiment, the document is opened with an "open in" functionality, which is often used on a mobile device. When the document is closed again, the desktop area of the mobile application becomes visible with representations of previously opened documents.

According to an embodiment of the present invention, the method further comprises the step of selecting a document by clicking on the representation of the document on the desktop area of the mobile application. In case of a plurality of representations on the desktop area, each single representation may be selected by the user. When the representation is selected, the representation is ready for further actions like viewing or printing. When a representation is selected, the representation changes its form or appearance, for example a change of color or an appearance of a colored border around the digital image, etc.

According to an embodiment of the present invention, the method further comprises the step of opening a preview of a selected document on at most the complete desktop area by clicking on the representation of the selected document. A first click of selecting the representation and a second click of opening the preview of the selected document may be combined so as to give an impression of a so-called double click. In case of a thumbnail image as a representation of the document, the opening of the preview may be established by enlarging the thumbnail image. The degree of enlargement may vary and depend on the size of the desktop area. A maximum enlargement is achieved by enlarging the digital document in order to fill the complete desktop area.

According to an embodiment of the present invention, the method further comprises the steps of showing reproduction settings and/or a reproduction activation area near the desktop area, clicking on the reproduction activation area, wherein the step of closing the document by the mobile application comprises submitting the document corresponding to a selected representation to the reproduction unit. The mobile application is aimed at reproduction of a digital document and therefore displays reproduction settings and a reproduction activation area near or besides of the desktop area. When a digital document is selected by means of a click on the corresponding representation and opened by means of a further click on the corresponding representation, the user may touch the reproduction activation area in order to print the digital image. Upon reproduction of the digital document, a preview of the document may be shown on the desktop area. When the digital document is reproduced, the preview is closed at the desktop area, and the representations present on the desktop area before the preview was shown are displayed again. Also, an additional representation for the just opened and closed digital document is shown, if not already present on the desktop area before opening of the digital document. The additional representation may appear at a location of the desktop area, which location is randomly determined by a control unit of the mobile device. A location of a representation on the desktop area may be stored together with the link in memory of the mobile device and recovered when restarting the mobile device. The reproduction settings may also be adapted before activating the reproduction activation area.

According to an embodiment of the present invention, the representation is movable to a location that is overlapping, adjacent to or near an already present at least one other representation in order to form a group of representations. By grouping the representations, the user may distinguish groups of digital documents from each other. Each group may also be sensitive for gestures applied on the group.

According to an embodiment of the present invention, the method further comprises the step of receiving a gesture from an input, the gesture encircling the group of representations in order to select the complete group for reproduction. The complete group may be selected for viewing or printing. In an alternative embodiment, representations form a group when they have a partial overlap with at least one of the other representations in the group. The representations of such a group form a visually connected unity. The gesture for selecting all representations of the group may just be a click on one of the representations of the group.

The present invention also relates to a non-transitory computer readable medium comprising computer executable program code configured to instruct a computer to perform the method according to any of the previous embodiments.

The present invention also relates to a mobile device having a user interface screen and being loaded with a mobile application showing a desktop area displaying a selectable representation of a document, which has been opened by the mobile application in a previous session of the mobile application, a reproduction settings area and/or a reproduction activation area, wherein upon a click on the reproduction activation area, a document corresponding to a selected representation is submitted to a wirelessly connected reproduction unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Figure 1A:
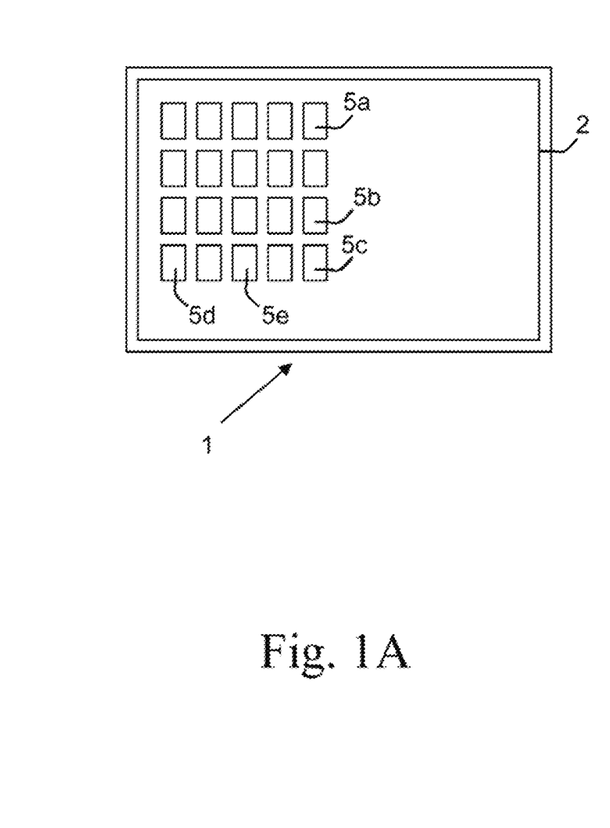
FIG. 1A is a diagram showing the user interface screen of the mobile device externally.

FIG. 1A is a diagram showing the user interface screen 2 of the mobile device 1. The user interface screen shows a plurality of icons 5a, 5h, 5c, 5d, 5e for mobile applications loaded in a memory of the mobile device 1. The window on which the icons are gathered is also known as the desktop of the mobile device. This is not the same as the desktop area of a mobile application according to the present invention. Such desktop area will be shown after a digital document is opened in that mobile application. For explanation reasons, a first icon 5a, a third icon 5c, a fourth icon 5d and a fifth icon Se represent mobile applications in which a digital document can be opened for viewing and/or printing purposes. A second icon 5b represents an e-mail mobile application loaded on the mobile device 1.

Figure 1B:
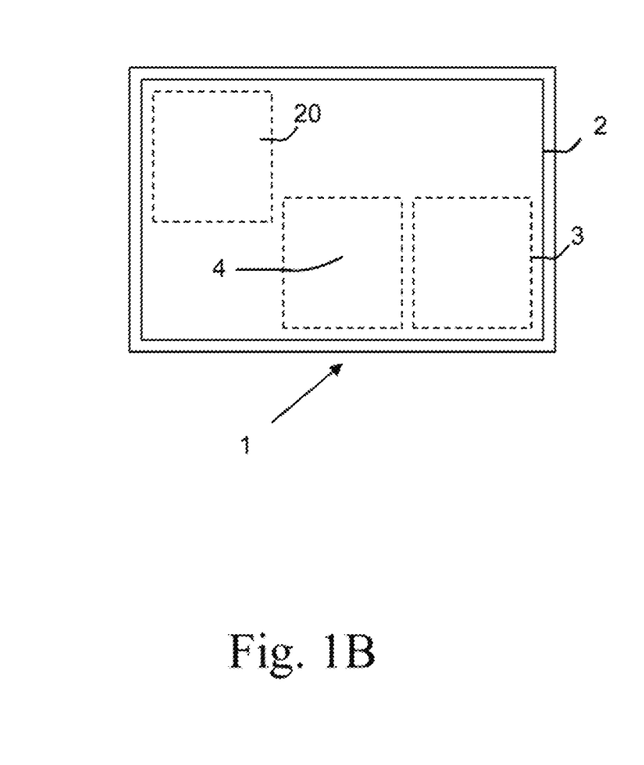
FIG. 1B is a diagram showing the mobile device partly internally.

FIG. 1B is a diagram showing the mobile device 1 partly internally, comprising a memory 3 for storing mobile applications, icons, representations and digital documents, a control unit 4 for controlling the mobile device, a send/receive module 20 for sending signals to respectively receiving signals from the outer digital world.

Figure 2A:
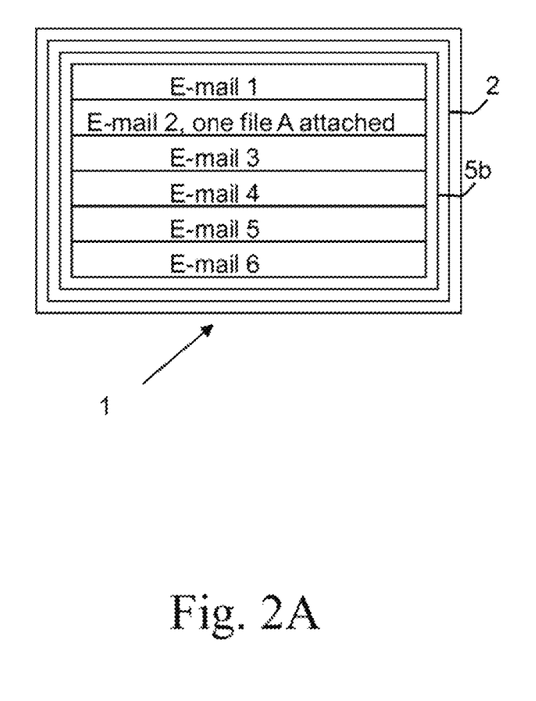
FIG. 2A is a diagram showing the user interface screen of the mobile device when an e-mail mobile application is opened.

FIG. 2A is a diagram showing the user interface screen 2 of the mobile device 1 when the e-mail mobile application corresponding to the second icon 5b is opened. The e-mail mobile application shows a number of e-mail messages. A digital document A is attached to the second e-mail message. When clicking on the second e-mail message, the e-mail message is opened. The digital document A may be represented by a file icon (not shown) or a file link. If the user wants to open the digital document A, he may click on the file icon or the file link.

Figure 2B:
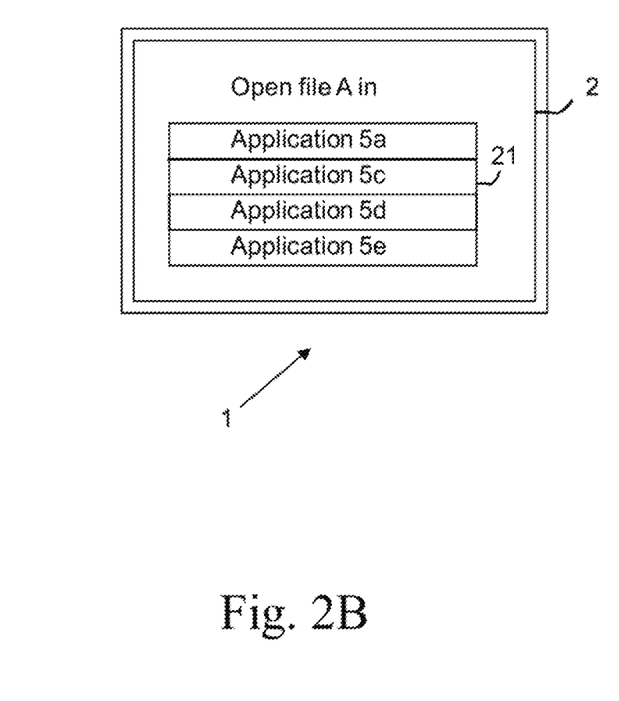
FIG. 2B is a diagram showing the user interface screen of the mobile device when a digital document attached to an e-mail message is intended to be opened in a mobile application according to the present invention.

FIG. 2B is a diagram showing the user interface screen 2 of the mobile device 1 when the icon or file link representing the digital document A attached to the second e-mail message is clicked on. A pop-up menu appears at the user interface screen 2 in order to show a selection list 21 of mobile applications corresponding to the displayed icons 5a, 5c, 5d, 5e in which the digital document can be opened. The user is requested to select one of the mobile applications in the shown list 21. When the user has clicked one of the entries in the list 21, for example the first mobile application corresponding to the first icon 5a, the digital document will be opened in the first mobile application corresponding to the first icon 5a.

Figure 3A:
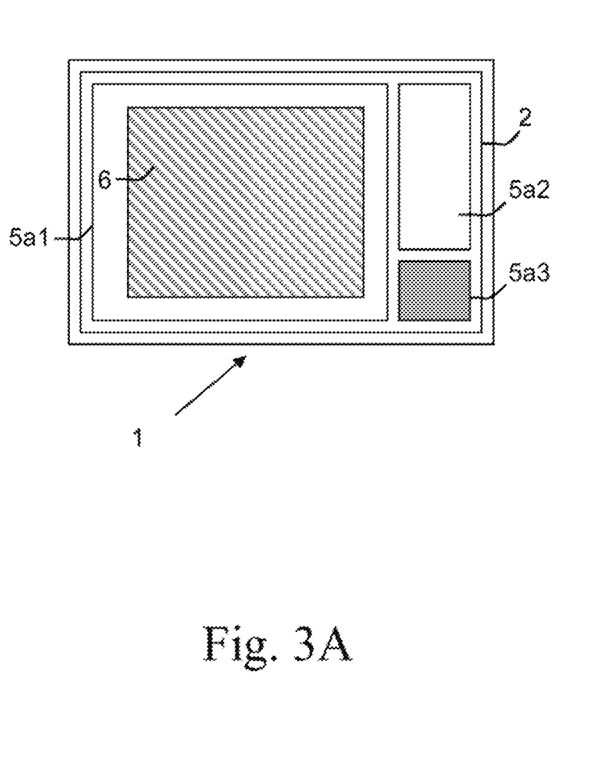
FIG. 3A is a diagram showing the user interface screen of the mobile device when the mobile application according to the present invention has opened the digital document on a desktop area on the user interface screen.

FIG. 3A is a diagram showing the user interface screen 2 of the mobile device 1 when the mobile application corresponding to the first icon 5a according to the present invention has opened the digital document A on a desktop area 5a1 within the mobile application 5a1 on the user interface screen 2. The digital document is shown as an image 6. Near the desktop area 5a1, a reproduction settings area 5a2 and a reproduction activation area 5a3 is displayed within the mobile application 5a. The user is allowed to change the reproduction settings in the reproduction settings area 5a2. The reproduction settings may be partly received from a reproduction unit, which is wirelessly connected to the mobile device 1 (See FIG. 4). The reproduction activation area 5a3 may be clicked for reproducing the digital document as displayed as image 6 on the desktop area 5a1.

Figure 3B:
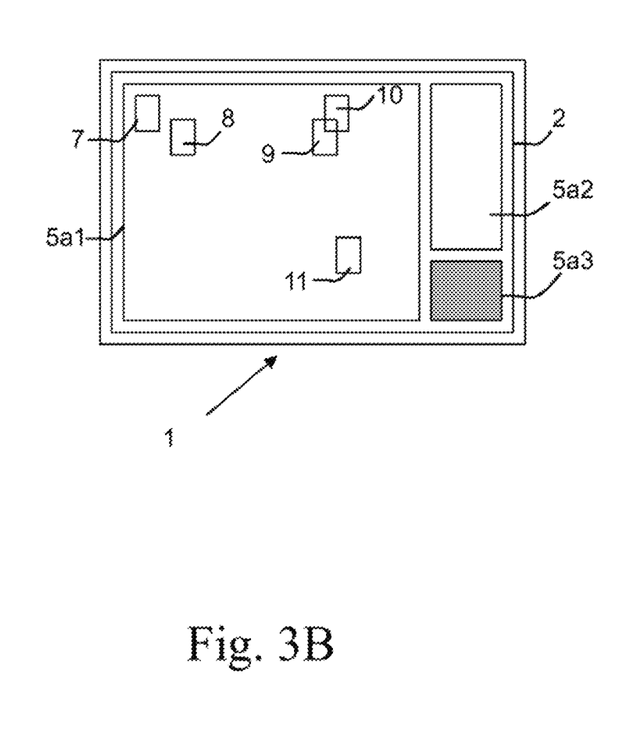
FIG. 3B is a diagram showing the same desktop area as in FIG. 3A, when the digital document is closed or when the mobile application is opened directly.

FIG. 3B is a diagram showing the same desktop area 5a1 as in FIG. 3A, when the digital document A is closed. In this embodiment the digital document A is closed while or after clicking on the reproduction activation area 5a3 as described in FIG. 3A. According to an alternative embodiment, the digital document A is closed by pinching the image 6 to a decreased size of a thumbnail image, which may represent the digital document A. When closing the digital document A, the link to the digital document is stored in the memory of the mobile device 1 and a representation 11 is created on the desktop area 5a1. The desktop area 5a1 comprises also representations 7, 8, 9, 10 representing previously closed digital documents. By clicking on one of the representations 7, 8, 9, 10, 11 the corresponding digital document is shown in a same size as image 6 at the desktop area 5a1 as shown in FIG. 3A. According to an embodiment of the present invention, the created representation 11 appears at a randomly determined location at the desktop area 5a1. However, the user is able to move each representation 7, 8, 9, 10, 11 to any location on the desktop area 5a1. In case of a touch screen, the user may drag the representation to the desired location in order to organize the document for easy retrieval. By moving representations at the desktop area 5a1, groups of representations may be created, which are visually connected, i.e. partially overlapping. For example, FIG. 3B shows a group of representations 9 and 10, which are partially overlapping. This grouping of representations may be used for easy multiple selecting of digital documents as, for example, shown in FIG. 8. FIG. 3B is also a diagram, which shows the desktop area 5a1, the reproduction settings area 5a2 and the reproduction activation area 5a3 when opening the mobile application directly by clicking on the corresponding icon 5a as shown in FIG. 1A. The user immediately gets an overview of the representations of documents, which are already present in the mobile application. Each of the representations can be selected by clicking on the representation.

Figure 8:
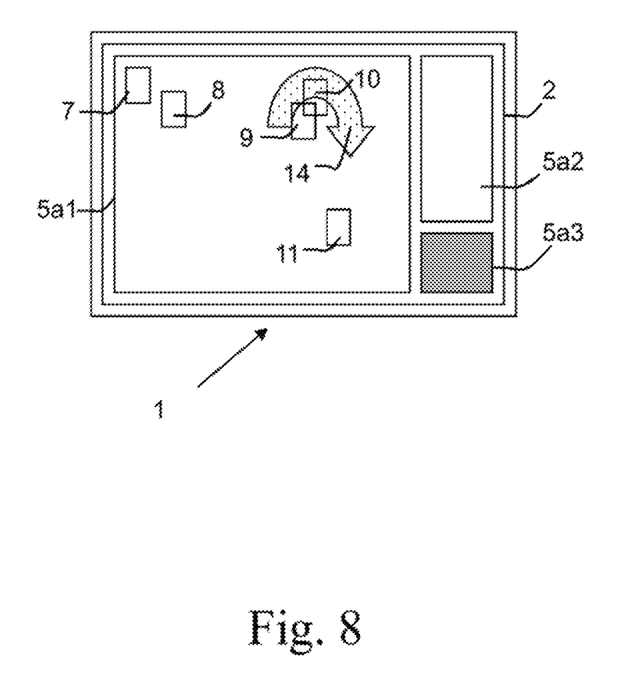
FIG. 8 is a diagram showing an encircling gesture for a group of representations at the desktop area on the user interface screen of the mobile device.

FIG. 8 is a diagram showing an encircling gesture 14 for the group of representations 9, 10 on the desktop area 5a1 on the user interface screen 2 of the mobile device 1, wherein the user interface screen 2 is a touch screen. The encircling gesture 14 may be a single touch and drag gesture describing a pan of a circle or part of an ellipse over and/or around the visually connected representations. The encircling gesture may also be a closed path enclosing all documents to be selected. The encircling gesture 14 is detected by the touch screen 2, all representations 9, 10 of the group are determined by the control unit of the mobile device 1 and the representations 9, 10 of the group are selected. By clicking on the reproduction activation area 5a3, all documents corresponding to the selected representations 9, 10 are reproduced. In an alternative embodiment, a single click on a group of representations may lead to a same action as the encircling gesture. In this embodiment, a single representation may be selected from a group of visually connected representations by, at first, isolating the single representation by dragging the single representation far enough away from the group that the single representation is not visually connected anymore to the group. The encircling gesture may also be applied to a plurality of representations, which are not all visually connected. The control unit of the mobile device determines an area in which the representations that are going to be selected, must reside. Such an area may be, for example, a circle part or an ellipse part, which is enclosed in the encircling gesture 14 and the part of the user interface screen 2 on which the encircling gesture 14 is applied. The user can always see and check which representations are selected after the gesture is interpreted by the mobile device control unit. The implementation of selection by an encircling gesture may be implemented outside the mobile application, for example at the operating system level, such that the gesture may also be applied in other mobile applications and to other digital objects on the user interface screen than representations.

Figure 4:
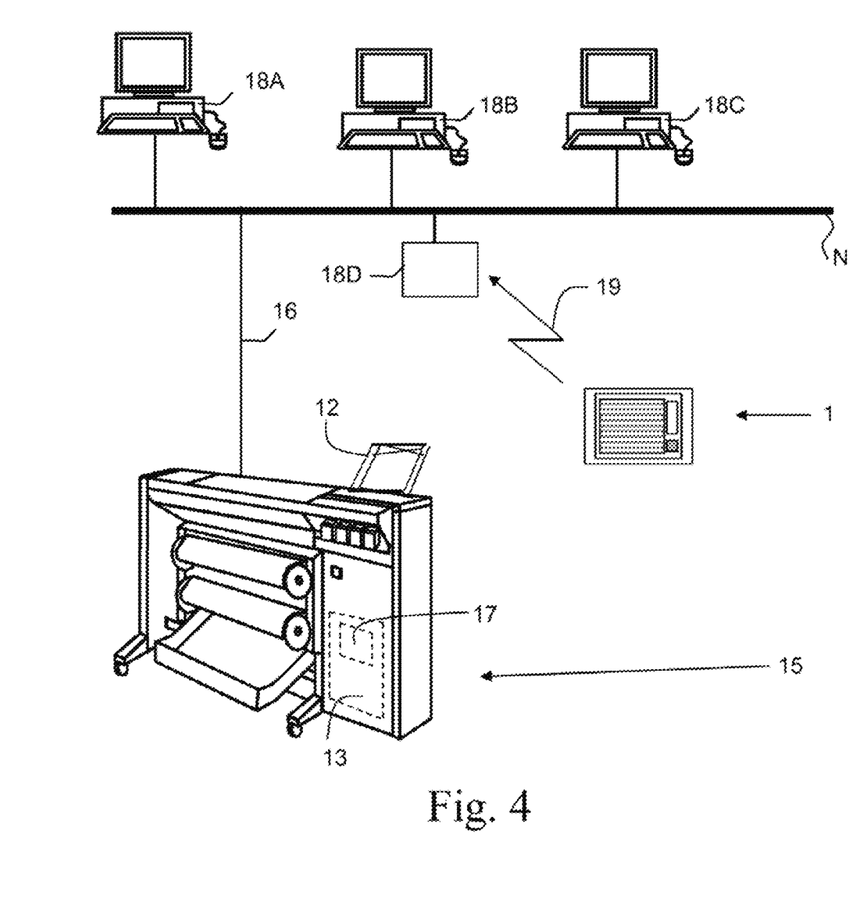
FIG. 4 shows a configuration of a mobile device in wireless connection to a reproduction system.

FIG. 4 shows a configuration of a mobile device 1 in wireless connection 19 to a wireless fidelity router 18D, which is in turn connected to a network N. A reproduction system 15 is also connected to the network N and is configured to receive signals via the network N from the wireless fidelity router 18D. The reproduction system 15 may comprise a display 12 connected to the controller 13, e.g. a computer system with processor and memory 17. The controller 13 may be integrated with the display 12 in a single housing. The display 12 may be a touch screen. The mobile device 1 is indirectly connected to the controller 13 by the connection 19 and the wireless fidelity router 18D and the network N as shown in FIG. 4. The reproduction system 15 may be a multifunctional printer, a small format printer or a wide format printer. The reproduction system 15 may be available via a network connection 16 for a user working with workstations 18A, 18B, 18C, which are connected via a network N. The workstations 18A, 18B, 18C may also be wirelessly connected to the network N via the wireless fidelity router 18D. The user may send a print job comprising a set of documents from the workstations 18A, 18B, 18C to the controller 13 of the reproduction system 15. The controller 13 comprises a storage device 17 for storing the print job. The display 12 is suitable for displaying print jobs by means of a scrollable list of representations representing the print jobs and for selecting a print job by selecting a representation from the scrollable list.

The controller 13 may be suited to queue print jobs, to check whether or not the print queue is empty and to submit a document from a queued print job to the print engine of the reproduction system 15 in order to be printed. The controller 13 comprises a storage device 17 for storing documents of a print job at least for the time period, which ends after the document is completely printed by the reproduction system 15. When a print job arrives at the reproduction system 15 according to FIG. 4 via the wireless connection 19 and the wireless fidelity router 18D from the mobile device 1, it is stored in the controller 13.

Figure 5:
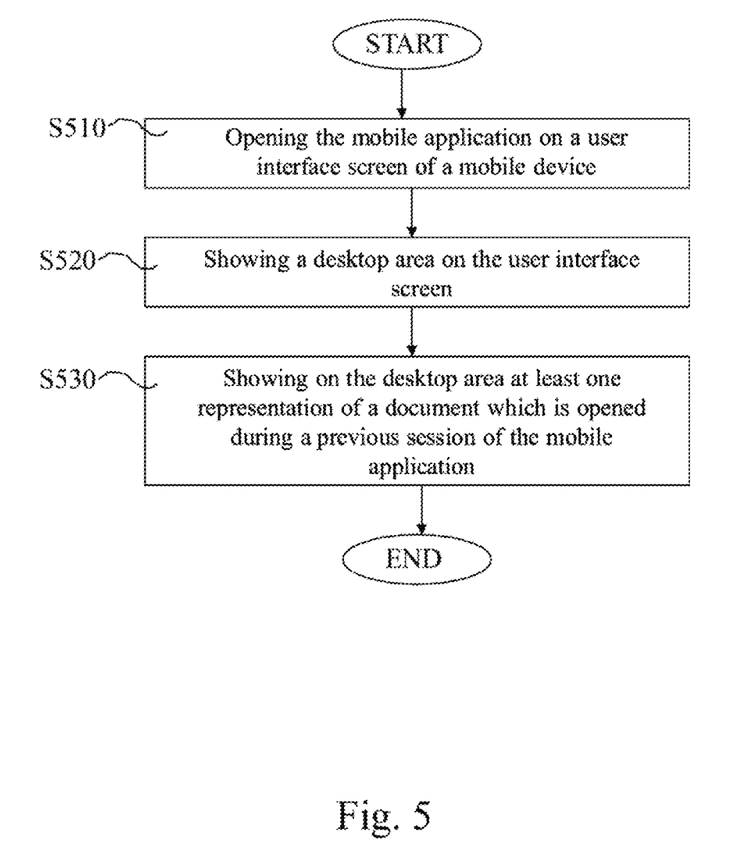
FIG. 5 is a flow diagram of an embodiment of the method according to the present invention.

FIG. 5 is a flow diagram of an embodiment of the method according to the present invention. According to a first step S510 of the method, the mobile application is opened on the user interface screen 2 of the mobile device 1. According to a second step S520 the desktop area 5a1 is shown on the user interface screen 2. According to a third step S530 at least one representation corresponding to a link to a document is showed on the desktop area 5a1. The at least one representation concerns a document, which has been opened during one of the previous sessions of the mobile application.

Figure 6:
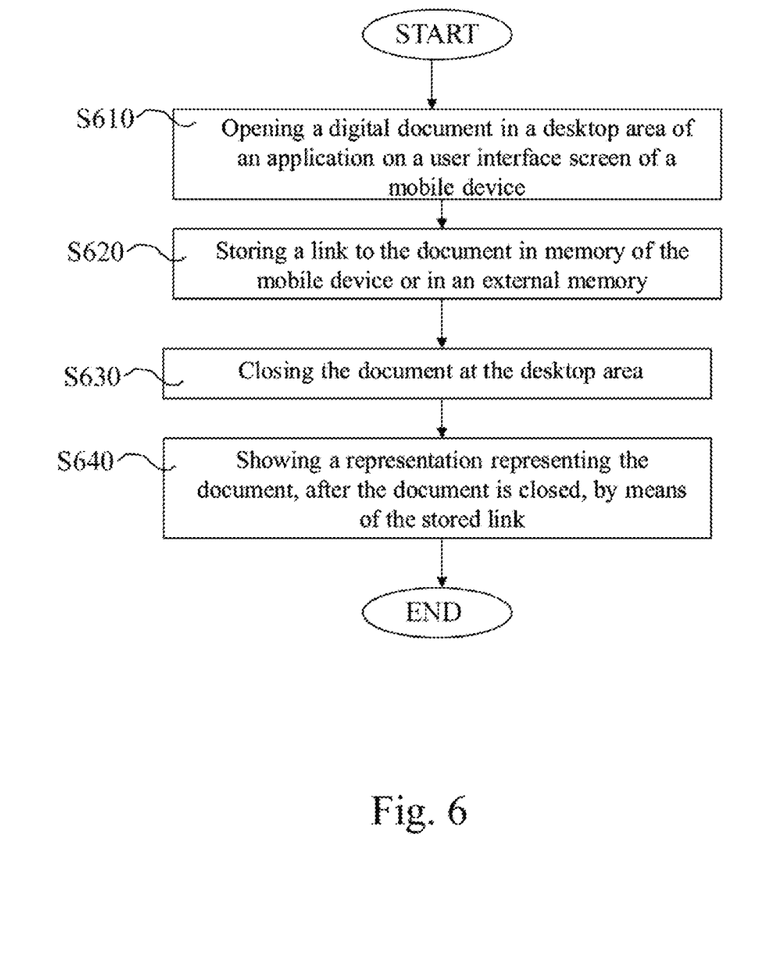
FIG. 6 is a flow diagram of another embodiment of the method according to the present invention.

FIG. 6 is a flow diagram of another embodiment of the method according to the present invention. According to a first step S610 of the method, a digital document is opened at the desktop area 5a1 of the mobile application 5a on the user interface screen 2 of the mobile device 1 (See FIG. 3A). A first image of the digital document is displayed at most the complete desktop area 5a1. If the digital document is a multi-image document, a navigator may be visible at the edges of the first image for navigating through the images. Alternatively, swiping gestures may be used at a touch screen for swiping through the images, respectively.

According to a second step S620, a link to the document is stored in the memory of the mobile device 1 or in an external memory. The external memory may reside in the connected network or in a connected digital cloud storage. The implementation order of the first step S610 and the second step S620 may vary: the steps may be sequentially or parallel processed by the mobile device 1.

According to a third step S630, the document is closed at the desktop area 5a1. This may be achieved by clicking on the reproduction activation area 5a3—the document is submitted to a reproduction unit and reproduced. After reproduction, the document may be closed and minimized to a representation at the desktop area 5a1. The third step S630 may also be achieved by pinching on the image 6 in case of a touch screen when only viewing of the document was intended by the user. The third step S630 may therefore be interpreted as a step of minimizing the displayed document from a size of at most the complete desktop area 5a1 to a thumbnail image representing the digital document.

According to a fourth step S640, a representation is shown at the desktop area 5a1. The representation represents the document. The representation is fetched by means of the stored link to the document. This representation appears after the document is closed. The representation may be a thumbnail image, an icon or a filename. In an embodiment, the location of the representation at the desktop area 5a1 is randomly determined. The user is able to move or to drag the representation to any location on the desktop area 5a1. In a further embodiment, the desktop area 5a1 may be panned to its own boundaries by swiping on the desktop area 5a1 so as to create more—empty—space for locating representations. Indicators may be arranged at the top, bottom, left side or right side of the desktop area 5a1 to indicate what part of the desktop area 5a1 is currently visible. This is advantageous when a lot of representations are already present on the desktop area 5a1 or a new group of representations has to be created according to the wishes of the user. The representations and their location on the desk top area 5a1 and the corresponding documents may be stored in the memory 3 of the mobile device 1 in order to be able to load the desktop area 5a1 with the same representations at the same locations in case of a switch off switch on action of the mobile device 1.

Figure 7:
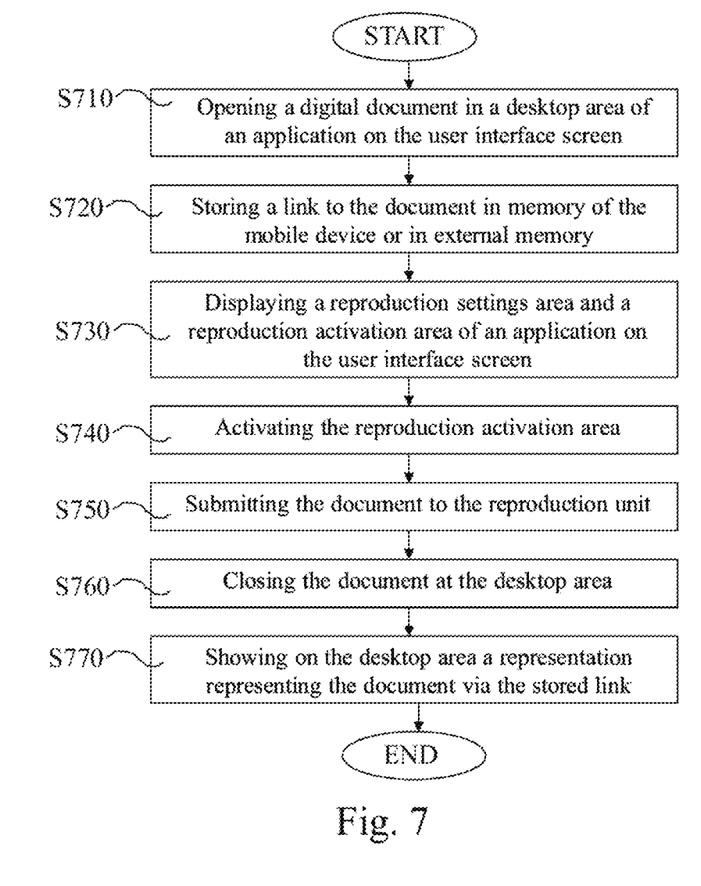
FIG. 7 is a flow diagram of another embodiment of the method according to the present invention.

FIG. 7 is a flow diagram of another embodiment of the method according to the present invention. According to a first step S710 of the method, a digital document is opened at the desktop area 5a1 on the user interface screen 2 of the mobile device 1 (See FIG. 3A). A first image of the digital document is displayed at at most the complete desktop area 5a1. If the digital document is a multi-image document, a navigator may be visible at the edges of the first image for navigating through the images. Alternatively, swiping gestures may be used at a touch screen for swiping through the images, respectively. The displayed digital document may be partially enlarged by de-pinching or spreading applied on the displayed digital document on the desktop area 5a1 in case of a touch screen. This is advantageous for viewing particular parts of the digital document and for checking the image quality of the digital document before reproduction.

According to a second step S720, a link to the digital document is stored in the memory of the mobile device 1 or in an external memory. The external memory may reside in the connected network or in a connected digital cloud storage.

According to a third step S730, a reproduction settings area 5a2 and a reproduction activation area 5a3 (See FIG. 3A) are displayed on the user interface screen near the desktop area 5a1. The reproduction settings area 5a2 may comprise all selectable reproduction systems (i.e. more than one reproduction system may be available for printing by means of the wireless connection to the mobile device), a media source, a scaling percentage input field, a number of copies, finishing option settings, folding settings, printer info settings, etc. The number of copies may also be arranged in the reproduction activation area 5a3 instead of an arrangement in the reproduction settings area 5a2. The reproduction settings may be changed in an optional intermediate step.

According to a fourth step S740, the reproduction activation area 5a3 is clicked on. According to a fifth step S750, the document is submitted to the selected reproduction unit. According to a sixth step S760, the document is closed at the desktop area 5a1. The fifth step S750 and the sixth step S760 may be exchanged or may be executed in parallel. When the document is closed, changed reproduction settings are stored at the memory 3 of the mobile device 1 and linked to the corresponding digital document and corresponding representation. By doing so, the reproduction settings are saved and available in case of a further reproduction action of the same document. A saved reproduction setting for the number of copies may be set to a default one when opening the same document again in order to possibly avoid unwanted copies of the document.

According to a seventh step S770, a representation is shown on the desktop area 5a1. The representation represents the closed document. The representation is fetched by means of the stored link to the document. The representation may be a thumbnail image, an icon or a filename.

The representation at the desktop area 5a1 may be selected by clicking on it. When a representation is selected and the reproduction activation area is clicked at the document corresponding to the selected representation is submitted to the reproduction unit in order to be reproduced. While submitting and reproducing, the representation may be replaced by a preview, which size equals at most the complete desktop area 5a1. After reproduction, the preview may be replaced by the representation.

The representation may be dragged to any location of the desktop area 5a1 as described earlier. In this way, the user is able to organize a plurality of representations according to the user's own wishes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of managing a document and submitting the document to a reproduction unit at a mobile device implemented as a mobile application, the mobile device having a user interface screen and being arranged for a wireless connection to the reproduction unit, the method in a first session comprising the steps of:
opening the mobile application on the user interface screen;
showing a desktop area of the mobile application on the user interface screen;
opening the document in the desktop area of the mobile application;
storing a link to the document in a storage of the mobile device;
closing the document at the desktop area; and
when closing the document, generating and showing a representation of the document on the desktop area, the representation being associated with the link stored in the storage of the mobile device, and being directly visible on the desktop area after the document is closed; and
closing the mobile application; and the method in a second session comprising the steps of:
opening the mobile application on the user interface screen;
showing the desktop area of the mobile application on the user interface screen;
loading the link to the document from the storage of the mobile device, the link to the document having been stored in the first session of the mobile application;
showing the representation on the desktop area, the representation being associated to the loaded link to said document;
selecting the document by clicking on the representation of the document on the desktop area of the mobile application; and
submitting the selected document to the reproduction unit.

2. The method according to claim 1, wherein the representations are movable to any place of the desktop area.

3. The method according to claim 1, wherein the method further comprises the steps of:
opening a document in the mobile application on the desktop area according to a size, which equals at most the size of the desktop area;
permanently storing a link to the opened document;
closing the document by the mobile application; and
automatically showing the desktop area comprising a representation associated to the stored link to the document, in addition to representations associated to links to documents that were already stored in previous sessions of the mobile application.

4. The method according to claim 1, wherein the method further comprises the step of opening a preview of a selected document on at most the complete desktop area by clicking on the representation of the selected document.

5. The method according to claim 4, wherein the method further comprises the steps of:
showing reproduction settings and/or a reproduction activation area near the desktop area; and
clicking on the reproduction activation area,
wherein the step of closing the document by the mobile application further comprises the step of submitting the document corresponding to the selected representation to the reproduction unit.

6. The method according to claim 1, wherein the representation is movable to a location that is overlapping, adjacent to or near an already present at least one other representation in order to form a group of representations.

7. The method according to claim 6, wherein the method further comprises the step of receiving a gesture from an input, the gesture encircling the group of representations in order to select the complete group for reproduction.

8. A non-transitory computer readable medium comprising computer executable program code configured to instruct a computer to perform the method according to claim 1.

9. A mobile device, comprising:
a user interface screen;
a processor; and
a storage,
the mobile device being loaded with a mobile application showing a desktop area displaying representations of documents that have been opened by the mobile application in previous sessions of the mobile application, a reproduction settings area and/or a reproduction activation area,
wherein the processor is configured to:
in a first session of the mobile application, store a link to a document that is opened and shown in the desktop area of the mobile application in the storage of the mobile device, and when closing the document, generate and show a representation of the document on the desktop area of the mobile application after the document is closed, the representation being associated with the link stored in the storage, and being directly visible on the desktop area after the document is closed, and in a second session of the mobile application when the mobile application is reopened, load the link to the document, which has been generated in the first session of the mobile application, from the storage of the mobile device, show the representation on the desktop area that is associated to the loaded link to the document, select the document upon a click on the representation of the document on the desktop area of the mobile application, and send the selected document to a wireless connected reproduction unit upon a click on the reproduction activation area.

\* \* \* \* \*